(No Model.)  3 Sheets—Sheet 1.

J. P. LAVIGNE.
BUTTON SETTING MACHINE.

No. 438,110. Patented Oct. 7, 1890.

Witnesses
J. H. Shumway
Lillian D. Kelsey

Joseph P. Lavigne
Inventor
By Attys
Earl W. Seymour (No Model.) 3 Sheets—Sheet 2.
J. P. LAVIGNE.
BUTTON SETTING MACHINE.
No. 438,110. Patented Oct. 7, 1890.
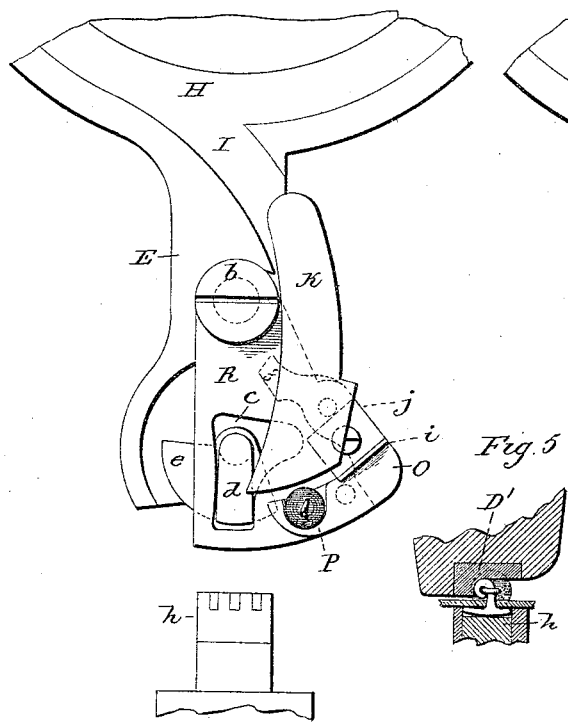
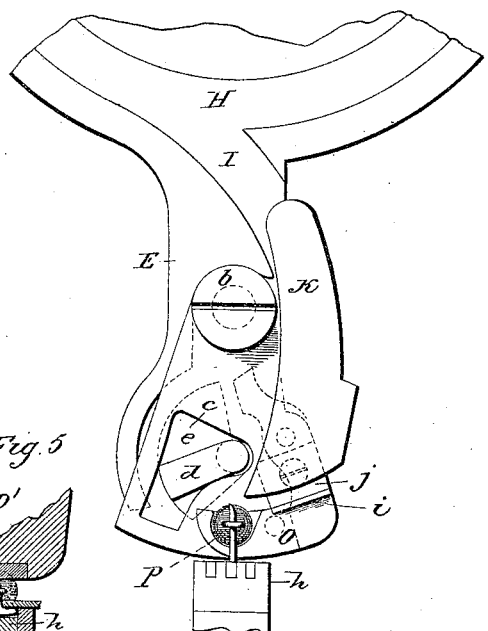
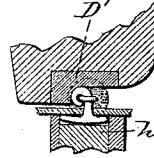
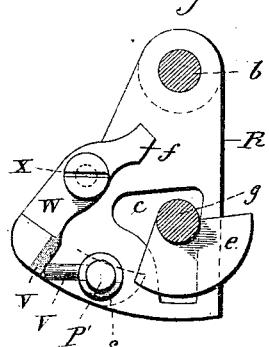
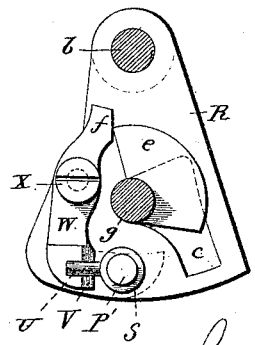
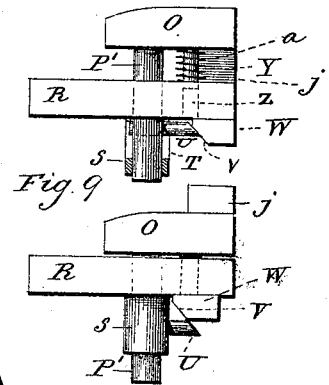

(No Model.) 3 Sheets—Sheet 3.
J. P. LAVIGNE.
BUTTON SETTING MACHINE.
No. 438,110. Patented Oct. 7, 1890.
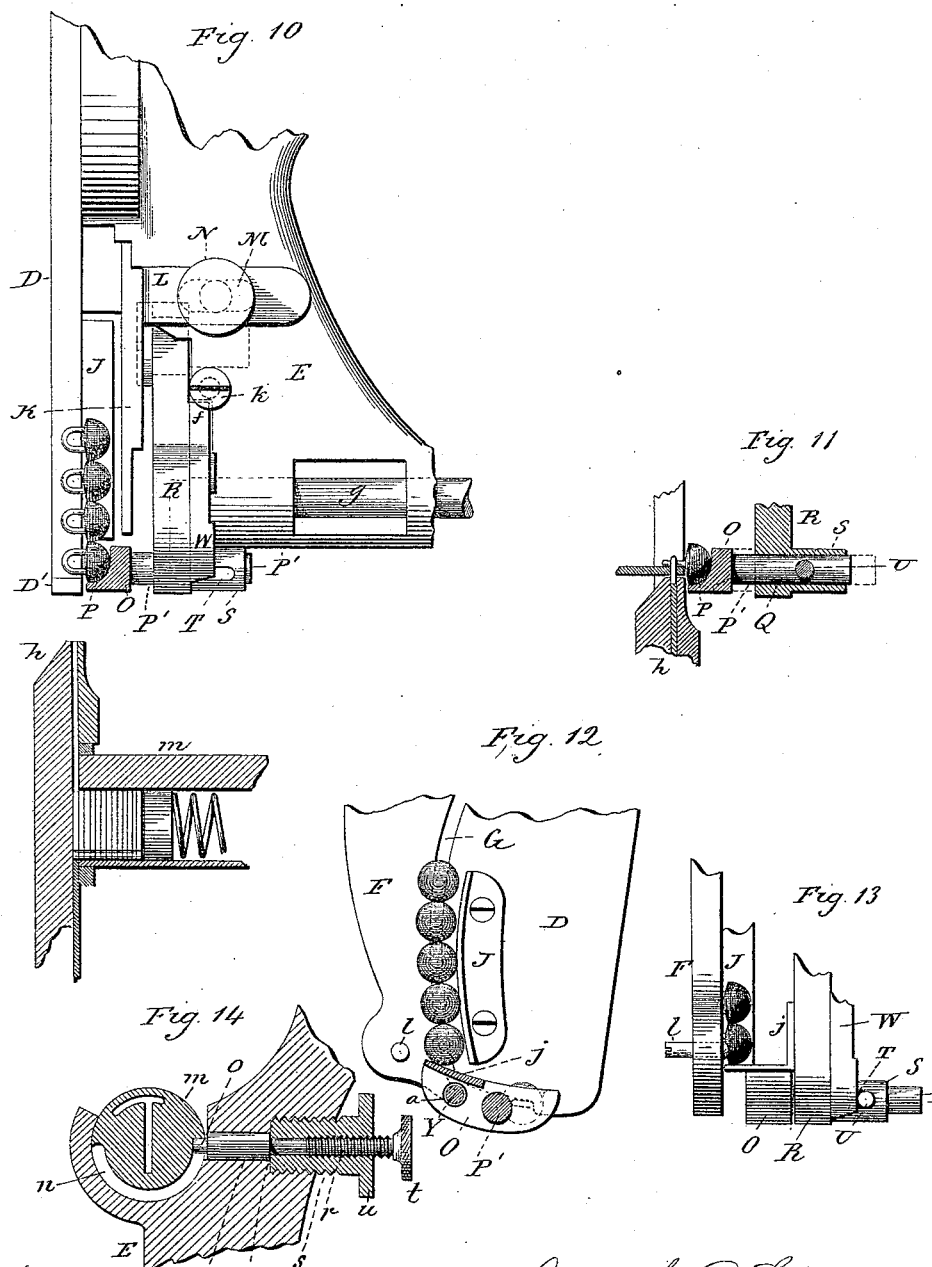

UNITED STATES PATENT OFFICE.

JOSEPH P. LAVIGNE, OF NEW HAVEN, CONNECTICUT, ASSIGNOR TO REUBEN H. BROWN, OF SAME PLACE.

BUTTON-SETTING MACHINE.

SPECIFICATION forming part of Letters Patent No. 438,110, dated October 7, 1890.

Application filed February 7, 1890. Serial No. 339,598. (No model.)

*To all whom it may concern:*

Be it known that I, JOSEPH P. LAVIGNE, of New Haven, in the county of New Haven and State of Connecticut, have invented new Improvements in Automatic Button-Fastening Machines; and I do hereby declare the following, when taken in connection with accompanying drawings and the letters of reference marked thereon, to be a full, clear, and exact description of the same, and which said drawings constitute part of this specification, and represent, in—

Figure 1:
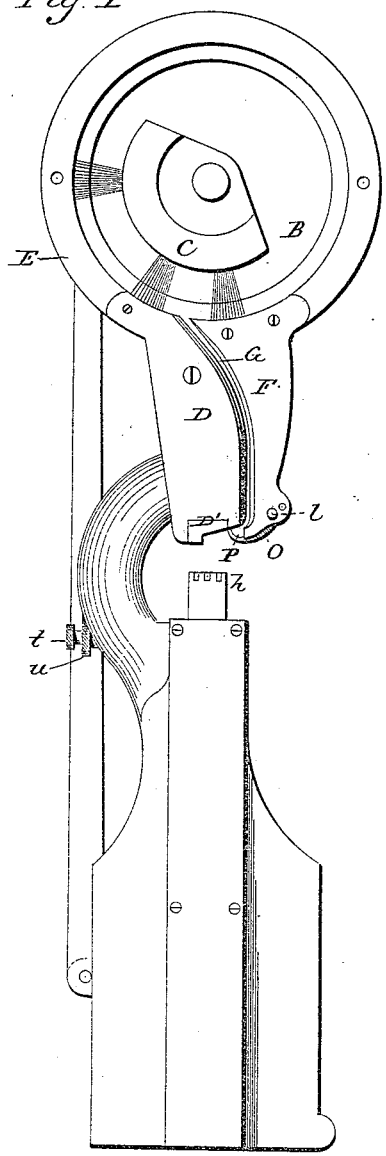
Figure 2:
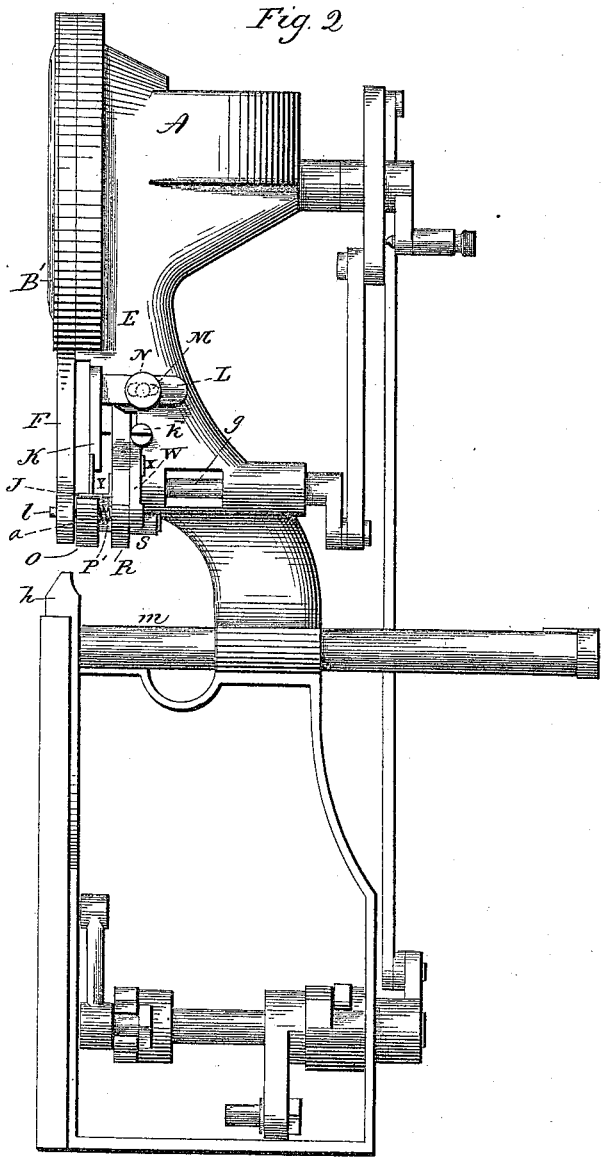

Figure 1, a view in front elevation of a machine embodying my invention with the cap-plate of the button-container removed; Fig. 2, a view of the machine in side elevation; Fig. 3, a detached broken view in elevation showing the lower edge of the button-container, the upper end of the trackway, and the button-feeding mechanism, which is exposed by the removal of the die-holder and the plate co-operating therewith to form the raceway; Fig. 4, a similar view showing the said parts in the positions which they occupy when a button has been fed over the clinching mechanism in position to receive a fastener; Fig. 5, a detached broken view in section showing how the end of the fastener is turned by the die; Fig. 6, a detached view, in rear elevation, showing the feeding mechanism; Fig. 7, a similar view with the parts thereof in the positions which they occupy when the button-carrier has been retracted for releasing the button; Fig. 8, a view of the same parts, taken from their lower edges and shown in the positions which they occupy in Fig. 6; Fig. 9, a similar view of the same parts, shown in the positions which they occupy in Fig. 7; Fig. 10, an enlarged broken view, in side elevation, showing the feeding mechanism, the gage, a column of buttons in the raceway, and portions of the clinching mechanism and the magazine for the fasteners; Fig. 11, a view in vertical section showing the presentation of a button by the button-carriers to the clinching mechanism, which is elevated to turn the point of the fastener over in the die of the machine; Fig. 12, a view in inside elevation showing particularly the action of the cut-off or detainer, which holds the column of buttons while the button in the button-carrier is being carried forward to the clinching mechanism; Fig. 13, a view of the same parts in side elevation; Fig. 14, a view in vertical transverse section through the magazine and the frame of the machine and showing the provision made for holding the magazine in place and for relieving it to permit it to be rotated for reloading.

My invention relates to an improvement in automatic machines for attaching buttons to shoes, and more particularly to the button-feeding and fastener-feeding mechanism thereof, the object being to make the button-feeding mechanism more positive in operation, and simpler, stronger, more durable, and easier of attention and repair, and to provide for reloading the fastener-feeding magazine without moving the same longitudinally and so giving an opportunity of escape to the fasteners contained in it.

With these objects in view my invention consists in certain details of construction and combinations of parts, as will be hereinafter described, and pointed out in the claims.

As herein shown, the machine is provided with a hopper A, a button-container B, into which the loose buttons are discharged from the hopper, a cap-plate B' for the said button-container, a revolving brush C, located within the said container, a die-holder D, carrying a die D', secured to the frame E of the machine, and a plate F, secured to the lower edge of the button-container B, the inner edges of the said die-holder and plate being beveled and sufficiently separated from each other to form a raceway G to receive the eyes of the buttons flatwise. An opening H, formed in the lower edge of the circular button-container B, has a curved bottom I, which co-operates with a curved guide J, attached to the inner face of the die-holder D, in forming a trackway for the heads of the buttons as they are fed. A vertical gage K, slightly curved longitudinally and located directly back of the raceway G, before mentioned, stands against the outer faces or crowns of the heads of the buttons and prevents them from being inwardly displaced, this gage being provided at its upper end with a horizontal finger L, having an elongated slot M, receiving a screw N, entering the frame E of the machine and employed for adjusting the gage within the limits of the length of the slot, according to the size of the buttons being fed. Provision is made in the devices above described for presenting the buttons each in the same position to the individual button-feeding mechanism of the machine, and to that mechanism the first part of my invention particularly relates. The said individual button-feeding mechanism is provided with a horizontal button-carrier O, having its inner end provided with a cup-like recess P, the lower end whereof is closed to adapt it to retain a button, its upper end being open to adapt it to receive a button from the column of buttons supported above it. This button-carrier is supported in part by a horizontal carrying-pin P', projecting rearwardly from its inner face and passing through an opening Q, formed to receive it in the lower end of the pivotal carrying-head R, the said head being provided upon its rear face with a sleeve S, arranged in alignment with the opening Q and forming a bearing for the outer end of the pin. The said sleeve S is provided with an elongated horizontal slot T, receiving a beveled operating-pin U, mounted in the outer end of the pin P' and extending transversely thereto and having the outer face of its outer end beveled to co-operate with a bevel V of opposite inclination, formed at the lower end of a retracting-lever W, pivoted to the rear face of the carrying-head R on a screw-stud X. The said button-carrier is prevented from turning on the pin P' by means of a guide-pin Y, projecting from its inner face and entering a bore Z, formed for it in the lower end of the carrying-head R. A small spiral spring a, encircling the said guide-pin and interposed between the inner face of the button-carrier and the outer face of the carrying-head, exerts a constant tendency to throw the button-carrier forward into its feeding position. The said carrying-head R is pivotally hung from its upper end on a screw-stud b, entering the machine-frame E, and is provided at its lower end and near one of its edges with an irregular cam-opening c, receiving an actuating-cam d of elongated and slightly-tapering shape, and located in front of a retracting-cam e, situated between the inner face of the carrying-head R and the machine-frame E, and engaging with the upper end f of the retracting-lever W and operating the same in retracting the button-carrier, as will be described later on. These two cams d and e have the same center, and both are rigidly connected with the forward end of a horizontal feed-shaft g, mounted in the machine-frame, and connected at its opposite end by means which need not be described with the same power-connections which operate the revolving brush C, the individual button-feeding mechanism of the machine, and the clinching mechanism h thereof. The said opening c, formed in the carrying-head R, conforms in shape at its lower end to the shape of the outer end of the actuating-cam d, but is enlarged at its upper end, so as to clear the said cam as the same is gradually shifted from a vertical to a horizontal position, whereby the carrying-head R is swung by the cam d to bring the button-carrier over the clinching mechanism h, and then allowed to stop while the feed-shaft continues its revolution and effects through the revolving cam e the retraction of the button-carrier to release the button therein. The outer end of the button-carrier is very slightly cut away, as at i to receive the cut-off or detaining plate j, secured to the outer face of the carrying-head R, and operating to hold the column of buttons in place and prevent them from coming down when the button-carrier is transversely moved under them for the purpose of carrying the button contained in it to the clinching mechanism. A tripping-screw k is mounted in the machine-frame in position for engagement with the upper end f of the retracting-lever to withdraw the lower end thereof from engagement with the beveled operating-pin mounted in the carrying-pin of the button-carrier. It is of course apparent that this tripping-screw may be replaced by any other suitable means for accomplishing the same result. The horizontal throw of the button-carrier is adjusted to conform to the thickness of the buttons employed by means of an adjustable stop composed of a screw l, mounted in the lower end of the plate F, in position to be engaged by the outer end of the carrier, so that when the same is thrown forward by the spring a it will be arrested in the right position by the inner end of the said screw, which it engages.

In carrying out the second part of my invention I provide the fastener-magazine m at a point where it has its bearing in the machine-frame, with a circumferential slot n, adapted in length to permit the magazine to be rotated from its feeding to its loading position, and vice versa, and no farther. This slot receives the shouldered outer end o of a cylindrical check-block p, also provided at its inner end with a shoulder q and located at the inner end of a retaining-screw r, extending through an interiorly-threaded binding-screw s and operative independently thereof, the said screw r being provided at its outer end with a knurled head t, and the binding-screw s being provided with a similar but larger head u. The said binding-screw is mounted in the machine-frame and engages with the magazine at points thereon on opposite sides of the slot n, before mentioned. When it is desired to rotate the magazine for reloading it, the binding-screw is turned just enough to relieve the magazine and no more and the retaining-screw turned to partially withdraw the shouldered outer end o of the check-block p from the slot n, its entire withdrawal therefrom being prevented by the engagement of the shoulder q of the block with the inner end of the binding-screw. The magazine is now free to be rotated within the limits allowed by the slot, but is held against longitudinal movement in the machine-frame by the bearing still preserved between the slot and the shouldered outer end $o$ of the check-block. By thus providing for the rotation of the magazine without moving it longitudinally the escape of fasteners from it during the operation of loading is avoided. If it is desired to remove the magazine from the machine-frame, the binding-screw is turned so as to not only clear it from the magazine, but also to entirely clear the check-block therefrom. When the machine is in use, the two screws co-operate to rigidly hold the magazine in its operating position.

Having now described in detail the construction of my improved feeding mechanism, I will proceed to set forth the operation thereof.

A button having been fed into the button-carrier by the descent of the whole column of buttons above the same, the said carrier is in the timing of the machine moved over the clinching mechanism, as shown by Fig. 5 of the drawings. When the button is first introduced into the carrier, its eye stands slightly inclined from the vertical, as shown by Fig. 3 of the drawings, having been a little deflected by the curve at the lower end of the raceway. Now as the carrier moves over the clinching mechanism the upper edge of the eye engages with the inner edge of the die-holder, whereby the button is turned so as to bring its eye into a horizontal position, as shown by Fig. 4 of the drawings. The clinching mechanism is now elevated and passes the shank of the fastener, which it carries, through the eye of the button, as shown by Fig. 4 of the drawings, the clinching mechanism co-operating with the die in its further ascent to turn the shank of the fastener over upon itself, as shown by Fig. 5 of the drawings. The column of buttons all this time is supported by the cut-off, which is moved under them as the button-carrier is swung over the clinching mechanism. The button having now been attached to the shoe, the retracting-cam $e$ co-operates with the upper end $f$ of the retracting-lever W in forcing the lower end of the said lever toward the beveled operating-pin U, mounted in the rear end of the carrying-pin P of the button-carrier, the said carrying-pin and button-carrier being thus retracted to release the button and permit it to be withdrawn from the machine with the shoe. The button having been fed to the clinching mechanism and attached to the shoe and removed from the machine, the parts of the button-feeding mechanism are now brought back into position for receiving another button by the action of the actuating-cam $d$. Then just before the button-carrier is brought under the column of buttons the upper end of the retracting-lever engages with the tripping-screw $k$, whereby the lower end of the said lever is retracted from engagement with the beveled pin U, permitting the spring $a$ to throw the button-carrier forward in position to receive another button, when the operations above described are repeated, and so on.

It will be observed that I do not in my machine employ any springs for supporting the button or for operating the parts of the button-feeding mechanism, with the exception of the one spring which throws the button-carrier forward after it has been retracted for releasing the button. My improved device is therefore very positive and reliable in its operation. It also compensates readily for variations in the thickness of the buttons, which are roughly manufactured and do not closely conform in size, and is so durable and strong that it may be safely and successfully operated by persons unskilled in the use of machines of this description.

It is apparent that in carrying out my invention some changes from the construction herein shown and described may be made. I would therefore have it understood that I do not limit myself to such construction, but hold myself at liberty to make such changes and alterations as fairly fall within the spirit and scope of my invention.

Having now described my invention, what I claim as new, and desire to secure by Letters Patent, is—

1. In an automatic button-fastening machine, the combination, with a carrying-head pivotally suspended from its upper end, of a horizontal button-carrier mounted in the lower end of the said head so as to be reciprocated therein at a right angle to the plane in which the same is swung, a spring for moving the said carrier in one direction, a retracting-lever for retracting the carrier to permit the button to be released from it, and cams for actuating the said carrying-head and retracting-lever, substantially as described.

2. In an automatic button-fastening machine, the combination, with a carrying-head pivotally suspended from its upper end and provided with a cam-opening having a clearance-space at its upper end, of a button-carrier mounted in the said carrying-head, a retracting-lever pivoted to the said carrying-head and connected with the button-carrier, so as to retract the same for releasing the button therefrom, and cams for actuating the said carrying-head and retracting-lever, the cam-opening in the carrying-head being shaped so as to permit the carrying-head to remain at rest while the cam actuating the retracting-lever does its work, substantially as described.

3. In an automatic button-fastening machine, the combination, with a carrying-head pivotally suspended from its upper end, of means for swinging the said carrier on its pivot, a button-carrier mounted in the said head and arranged to be reciprocated at a right angle to the plane in which the same is swung, and an adjustable stop to gage the play thereof to buttons of different thickness, substantially as described.

4. In an automatic button-fastening machine, the combination, with a carrying-head pivotally suspended from its upper end, of means for swinging the said head on its pivot, a button-carrier mounted in the said head and arranged to be reciprocated at a right angle to the plane in which it is swung, and a detainer or cut-off secured to the said head and holding the column of buttons in place while the button is being fed to the clinching mechanism, substantially as described.

5. In an automatic button-fastening machine, the combination, with a carrying-head, of a button-carrier provided with a pocket to receive a button and supported by a carrying-pin which extends rearwardly through an opening in the carrying-head and through a slotted sleeve attached thereto, a beveled operating-pin mounted in the said carrying-pin, a retracting-lever pivoted to the said carrying-head and having its lower end beveled to co-operate with the beveled pin in retracting the button-carrier, cams for actuating said carrying-head and retracting-lever, means for tripping the retracting-lever to disengage its lower end from the said beveled pin, and a spring for throwing the button-carrier forward under the column of buttons when the retracting-lever is thus tripped, substantially as described.

6. In an automatic button-fastening machine, the combination, with a magazine for feeding the fasteners, provided with a circumferential slot, of an interiorly-threaded binding-screw adapted to be engaged with the face of the said magazine on opposite sides of the slot therein, and a retaining-screw mounted in the said binding-screw and entering the slot in the magazine, whereby by loosening the binding-screw and the retaining-screw the magazine may be turned for reloading and at the same time held against longitudinal displacement, substantially as described.

JOSEPH P. LAVIGNE.

Witnesses:
FRED C. EARLE,
LILLIAN D. KELSEY.